United States Patent [19]

Haass

[11] Patent Number: 4,607,146

[45] Date of Patent: Aug. 19, 1986

[54] CIRCUIT ARRANGEMENT FOR CONTROLLING THE TRANSMISSION CAPACITY OF THE RECEIVING BRANCH OF A TRANSMISSION SYSTEM

[75] Inventor: Adolf Haass, Munich, Fed. Rep. of Germany

[73] Assignee: Siemens Aktiengesellschaft, Berlin and Munich, Fed. Rep. of Germany

[21] Appl. No.: 653,670

[22] Filed: Sep. 21, 1984

[30] Foreign Application Priority Data

Sep. 29, 1983 [DE] Fed. Rep. of Germany ....... 3335391
Feb. 22, 1984 [DE] Fed. Rep. of Germany ....... 3406407

[51] Int. Cl.[4] ............................................. H04B 3/20
[52] U.S. Cl. ............................... 179/170.8; 179/170.2
[58] Field of Search ............... 179/170.2, 170.6, 170.8, 179/81 B, 100 L; 381/104, 107

[56] References Cited

U.S. PATENT DOCUMENTS

| | | | |
|---|---|---|---|
| 3,754,105 | 8/1973 | Poschenrieder et al. | 179/170.2 |
| 3,896,273 | 7/1975 | Fariello | 179/170.6 |
| 4,005,277 | 1/1977 | Araseki et al. | 179/170.2 |
| 4,282,411 | 8/1981 | Stewart | 179/170.2 |
| 4,360,712 | 11/1982 | Horna | 179/170.2 |
| 4,513,177 | 4/1985 | Nishino et al. | 179/81 B |

Primary Examiner—Gene Z. Rubinson
Assistant Examiner—R. Vaas
Attorney, Agent, or Firm—Thomas H. Jackson

[57] ABSTRACT

In order to control the transmission capacity of the receiving branch of a transmission system comprising this receiving branch as well as a transmitting branch with an echo compensation network, the system generates a level-indicating signal, which indicates, at an output of an amplifier (Am), the signal level contained in the receiving branch, plus a level change-indicating signal, which indicates level changes in this branch. These two signals are linked logically to one another in such manner that the output circuit of the amplifier (Am) is enabled for signal transmission only upon simultaneous occurrence of a level-indicating signal which indicates the presence of a prescribed level and a level change-indicating signal which indicates that a prescribed level change has not been exceeded.

5 Claims, 2 Drawing Figures

CIRCUIT ARRANGEMENT FOR CONTROLLING THE TRANSMISSION CAPACITY OF THE RECEIVING BRANCH OF A TRANSMISSION SYSTEM

BACKGROUND OF THE INVENTION

The invention relates to a circuit arrangement for controlling the transmission capacity of the receiving branch in a full-duplex transmission system which is connected by its transmitting and receiving branches to a two-wire transmission line via a hybrid circuit. An echo compensation network is provided between transmitting and receiving branches of the transmission system and an amplifier is arranged in the receiving branch.

Circuit arrangements of the type referred to above are already generally known (see, for example, "Adaptive Reference Echo Cancellation" by D. Falconer, *IEEE Transactions on Communications,* Vol. Com. 30, No. 9, September 1982, pages 2083 to 2094; and German patent No. 2,944,486). In these known systems difficulty is experienced when regular operation is resumed following a line break on the two-wire transmission line. When a line break occurs the system echo compensation network functions in such a manner that, for the particular circumstances of the line break, an exact compensation is effected of the signal components which are emitted from the associated transmitting branch so as to prevent cross-talk in the associated receiving branch. When the previously interrupted two-wire transmission line resumes operation, the echo compensation network must first be set in accordance with the changed conditions before data signals emitted from another subscriber station—referred to herein as the "opposite station"—can be satisfactorily received. In this case, in order to prevent that faulty data signals reach a data terminal connected to a transmission system of this type, the data signal reception must be blocked during this last-mentioned compensation process. For this purpose it is possible to use a timer, although a timer cannot determine and duplicate that period of time which corresponds to the actual conditions of the system; namely, the time during which the data signal reception is or will be blocked.

SUMMARY OF THE INVENTION

A principal object of the present invention is to provide relatively simple means for indicating when data signal reception can be reinitiated following a period during which a line-break has occurred on a two-wire line.

A more particular object of the present invention is to improve a transmission system of the type having separate transmitting and receiving branches connected to a 2-wire transmission line by a 2 to 4 wire hybrid circuit having an echo compensation network coupled between the transmitting and receiving branches, and having an amplifier arranged in the receiving branch.

A still further object of the present invention is to provide a circuit arrangement for a transmission system of the type just described for controlling the transmission capacity of the receiving branch thereof.

These objects, as well as other objects which will become apparent in the discussion that follows, are achieved, according to the present invention, by providing a circuit arrangement that generates a level-indicating signal, which indicates the output level of the amplifier contained in the receiving branch, plus a level change-indicating signal, which indicates level changes in this branch. The circuit arrangement also provides logic means responsive to these two signals which enable the output circuit of the amplifier for transmission only upon simultaneous occurrence of a level-indicating signal which indicates the presense of a prescribed level and a level change-indicating signal which indicates that a prescribed level change has not been exceeded.

The circuit arrangement according to the invention makes it possible, with a relatively small investment in circuitry, to activate the receiving branch of the transmission system for data signal reception only when the compensation set up procedures, which influence this branch, have been effectively terminated. This will occur, on one hand, after an adequate line signal is received following a line break and when any drastic changes in level of the received signal have ceased. It can then be assumed that regular data reception can be resumed or is taking place.

Expediently, the amplifier employed in the receiving branch of the transmission system includes means for controlling its amplification in digital steps by means of a parallel digital signal. In this case, a level monitoring device is provided which monitors the digital amplifier control signal for the presence of the prescribed bit pattern differences in successive amplifier adjustment cycles. In this manner, the particular signal level and the particular change in signal level can be determined in a relatively simple manner.

Preferably, the aforementioned level monitoring device is constructed as follows:

A clock pulse controlled register is used to supply the parallel digital control signal to the amplifier. This register has both parallel inputs and parallel outputs which are connected to parallel outputs and parallel inputs, respectively, of a full adder. A first exclusive-OR gate has two inputs connected to one parallel input of the register and a corresponding parallel output of the register, respectively. The output of this exclusive-OR gate controls the position of a switch having a first input connected to a further parallel output of the register. A clock pulse-controlled bistable element (flip-flop) has its "D" input connected to the output of the switch and has a non-inverting output connected to a second input of the switch. A second exclusive-OR gate has a first input connected to a further parallel input of the register corresponding to the aforementioned further parallel output and has a second input connected to the output of the bistable element. Finally, an AND-gate is connected to the outputs of both exclusive-OR gates and produces an output when binary "1" signals are received from both.

This circuit arrangement results in a particularly efficient yet relatively simply constructed level monitoring device which can be produced in integrated circuit technology.

Preferably the output signal of the aforementioned AND-gate is passed via an inverting delay element to a gate which controls the transmission capacity of the receiving branch.

For a full understanding of the present invention, reference should now be made to the following detailed description of the preferred embodiments of the invention, and to the accompanying drawings.

DESCRIPTION OF THE PREFERRED EMBODIMENTS

Figure 1:
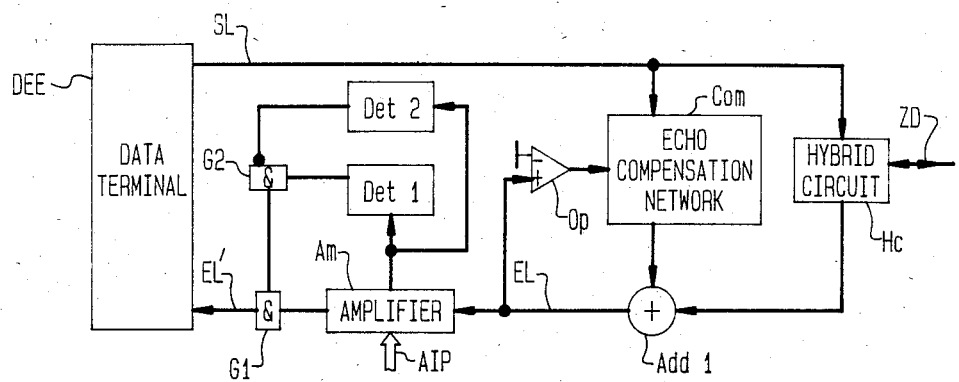
FIG. 1 is a block diagram of a transmission system incorporating the improvement in accordance with the invention.

The transmission system represented in FIG. 1 possesses a four-wire transmission line consisting of a transitting line SL, which is assigned to a transmitting branch, and a receiving line EL, EL' assigned to a receiving branch. In accordance with FIG. 1 the transmitting line SL and the receiving line EL' are connected to a data terminal device DEE which will be assumed to represent a device capable of emitting and receiving data signals.

The above-mentioned four-wire transmission line is connected via a hybrid circuit Hc to a two-wire transmission line ZD which can be used for full-duplex data signal transmission.

The transmitting line SL is also connected to the first input of an echo compensation network Com which at its output is connected to one input of an adder Add1. The adder Add1 is connected by a further input to the receiving branch output of the hybrid circuit Hc. The echo compensation network Com is connected by a control input to the output of a control amplifier Op. This amplifier Op is an operational amplifier having an inverting input ("−") connected to ground and a non-inverting input ("+") connected to the output of the aforementioned adder Add1 and thus to the receiving line EL.

As shown in FIG. 1 an amplifier Am is interposed into the receiving branch of the four-wire transmission line. The amplification of this amplifier Am is adjustable by means of parallel digital signals which are supplied to corresponding amplifier control inputs, indicated by the arrow AIP. The output of the amplifier Am is connected to an input of an AND-gate G1 which, in turn, is connected via the aforementioned receiving line EL' to a corresponding data signal input of the data terminal device DEE. A further input of the AND-gate G1 is connected to the output of a logic element G2, which will be assumed to consist of an AND-gate or a blocking element. The logic element G2 is connected at one signal input to the output of a level detector Det1, which serves a level monitoring function, and at a further signal input (e.g., an inhibit input) to the output of a level-change detector Det2. The inputs of the two detectors Det1 and Det2 are connected to a common output of the amplifier Am so that these detectors are able to determine, respectively, the signal level (Det1) as well as the signal level change (Det2) in the receiving branch of the transmission system.

The circuit arrangement represented in FIG. 1 operates as follows: The portion of this arrangement which comprises the two detectors Det1 and Det2 and the two logic elements G1 and G2 forms a level monitoring device in which: (1) the detector Det1 determines the presence or absence of a prescribed level in the received signal which is transmitted by the amplifier Am, and (2) the detector Det2 determines the presence or absence of a prescribed change in level of this signal within a prescribed period of time. The signals which indicate the states of the detectors Det1 and Det2 are logic-linked to one another by means of the two logic elements G1 and G2 in such manner that the output of the amplifier Am is passed to the data terminal DEE through the AND-gate G1 only when a signal indicating the presence of the prescribed level is available from the detector Det1 and a signal indicating that a prescribed level change has not been exceeded within the prescribed period of time is available from the detector Det2.

Figure 2:
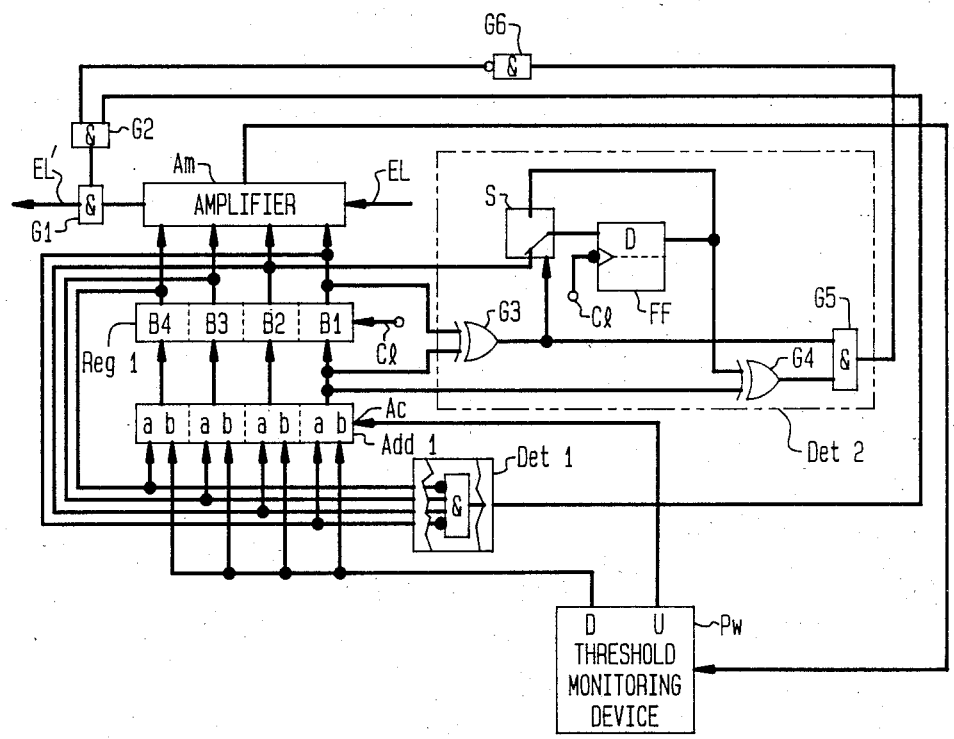
FIG. 2 is a detailed block diagram showing a preferred embodiment of a level monitoring circuit used in the transmission system of FIG. 1.

The preferred embodiment of the level monitoring device represented in FIG. 2 will now be considered in detail. As in FIG. 1, FIG. 2 shows the amplifier Am which is connected at its input to the receiving line EL and connected at its output to one input of AND-gate G1. The output of the AND-gate G1 is connected, in turn, to the receiving line EL'. Another input of the AND-gate G1 shown in FIG. 2 is connected to the output of the logic element G2. The inputs of the element G2 are connected to the remaining parts of the circuit in accordance with FIG. 2 in a manner to be discussed hereinbelow.

As shown in FIG. 2, the amplifier Am is connected by a series of digital control inputs to the outputs of the individual register stages B1, B2, B3 and B4 of a register Reg1, which register possesses both parallel inputs and parallel outputs.

The register Reg1 is supplied with clock pulses at a control or clock pulse input C1 and is connected at its parallel inputs to the outputs of individual adder stages of a full adder Add1. This adder is connected at its first inputs, which are referred to as "a" inputs, to the corresponding parallel outputs of the register stages B1 to B4 of the register Reg1. In this way each of the register stages B1 to B4 of the register Reg1 is connected at both its output and its input via an adder stage of the adder Add1.

As shown in FIG. 2, the other inputs—namely, "b" inputs—of the adder stages of the full adder Add1 are all connected to the D (down) output of a threshold level monitoring device Pw which is connected at its input to a signal (or control) output of the amplifier Am. This device Pw, which may be a Schmitt trigger for example, produces a signal at its "down" output D when the signal level received at its input is below a prescribed threshold, and produces a signal at its "up" output U when its input signal exceeds this prescribed threshold. A signal produced at the terminal D brings about a reduction in value of the contents of the register Reg1 and thus brings about a corresponding reduction in amplification in the amplifier Am. The carry-in input Ac of the full adder Add1 is connected to the U output of the level monitoring device Pw. A signal at this terminal causes the contents of the register Reg1 to be increased in value, which is associated with a corresponding increase in amplification.

In accordance with FIG. 2 the level detector Det1 is connected at its inputs to the outputs of the individual stages of the register Reg1. This level detector Det1 is represented in FIG. 2 as a single logic gate. It will be understood, however, that the level detector Det1 can, in principal, possess a plurality of interconnected logic elements which produce a specific signal such as a logic "1" at their output when a bit-combination corresponding to a prescribed signal level is presented as an input. The level detector Det1 is connected at its output to one signal input of the above-mentioned logic element G2.

The input and the output of the register stage B1 of the register Reg1 are both connected to the inputs of exclusive-OR gate G3. The output of this exlcusive-OR gate is connected to the control input of a switch S and one input of an AND-gate G5. The other input of the AND-gate G5 is connected to the output of a further exclusive-OR gate G4, one input of which is connected, in turn, to the input of stage B2 of the register Reg1. The other input of gate G4 is connected to the non-inverting output of a bistable D-type flip-flop FF.

The flip-flop FF is connected by its data input D to the switch contact of the change-over switch S. The switch S operates in such a manner that, when in a first position ("0"-position), it is connected to the output of the flip-flop FF and, when in the other position ("1"-position), it is connected to the output of the stage B2 of the register Reg1. The clock pulse input of the flip-flop is supplied with the same clock and control pulses which are fed to the clock pulse input C1 of the register Reg1.

The logic elements G3, G4, G5 and the flip-flop FF form the aforementioned level change detector Det2. The output of the AND-gate G5 of the detector Det2 is connected via an inverting delay element G6 to the first input of the above-mentioned logic element G2.

The level-monitoring device represented in FIG. 2 operates as follows: It will be assumed that initially a binary number has been loaded into the register Reg1, this number being such that the level detector Det1 produces a digital "0" signal at its output. As a result the logic element G2 likewise produces a digital "0" signal and, consequently, the AND-gate G1 is also blocked so that any signals emitted from the amplifier Am cannot reach the receiving line EL'.

If a correspondingly high signal level is applied to the amplifier Am via the line EL, the adder Add1 is supplied with a signal from the terminal U of the threshold device Pw. Each such signal causes the binary number which is supplied to the input of the adder Add1 to be incremented by the value +1. This incremented binary number is then emitted from the outputs of the adder Add1 and presented to the parallel inputs of the register Reg1 where it is received by the register stages B1 to B4 on the occurrence of the next clock pulse at the input C1. The parallel outputs of the stages B1 to B4 of the register Reg1 then present the relevant binary number to the inputs of the adder Add1 and to the inputs of the level detector Det1. If the prescribed level has not yet been reached, the level detector Det1 continues to emit a binary "0" signal at its output. This then corresponds to the conditions explained above. If the level detector Det1 determines that the prescribed level has been reached or exceeded, it produces a digital "1" signal at its output which is passed to the logic element (AND-gate) G2. In order for the logic element G2 to produce an output, and thus to permit data signals to be forwarded via the AND-gate G1 to the receiving line EL', the element G2 must receive a digital "1" signal from the output of the inverter element G6. This requires that the AND-gate G5 supply a digital "0" signal to the inverter G6. The conditions necessary for this to occur will now be explained in detail.

If the register Reg1 contains the bit combination 0000 in its register stages B1–B4, this number will be assumed to characterize a setting of the amplifier Am which is insufficient to produce an output on line EL'. When this bit combination is increased by 1, the inputs of these register stages are supplied with the new bit combination 0001. In this case the exclusive-OR gate G3 emits a binary "1" which is fed to the control input of the switch S and to the first input of the AND-gate G5. Upon the occurrence of this signal, with the next clock pulse at the clock pulse input C1 the flip-flop FF receives the signal of the register stage B2 (binary "0") that is present at its data input D at this instant of time. This means that a binary "0" signal will continue to be emitted from the output of the exclusive-OR gate G4. The AND-gate G5 thus also emits a binary "0" signal. If the adder Add1 is now incremented further by "1", the parallel inputs of the stages B4 to B1 of the register Reg1 are supplied with the bit combination 0010. This causes a binary "1" signal to again be emitted from the output of the exclusive-OR gate G3 and a binary "0" signal to again be emitted from the output of the flip-flop FF. In contrast to the above-described case, however, a binary "1" signal is now presented to the other input of the exclusive-OR gate G4 which means that in this case a binary "1" signal occurs at each of the two inputs of and AND-gate G5. As a result, the output of the AND-gate G5 now emits a binary "1" which passes through the inverting delay element G6 and causes the logic element G2 to produce a "0" output.

The transition from the above-considered bit-combination 0000 via the bit-combination 0001 to the bit-combination 0010—which, to be precise, relates only to the second increase (or reduction—01/10) in the register stages B1 and B2 of the register Reg1—characterises a level change during which the logic element G2 is blocked. This occurs in that the output signal of the D-type flip-flop FF lags behind the state of the register stage B1 by an amount corresponding to a change from the register stage B1—indicated by the exclusive-OR gate G3—and that the change in the output level of the register stage B2 lags behind the level presented at the input level or input signal of the register stage B2 and the output level of the flip flop FF. Thus an inequality between the output signal of the flip flop FF and the input signal of the register stage B2 is recognized only in the event of a continuous increase (or reduction) and is indicated as a binary "1" signal at the output of the exclusive-OR gate G4. As a result, the AND-gate G5 emits a binary "1" signal which, after passing through the inverting delay element G6, blocks the logic element G2 and thus also the AND-gate G1, thereby preventing transmission.

After the logic element G2 has been blocked by the output of the level detector Det1, due to insufficient signal level, substantial changes in the bit combination of the register Reg1—characterised by a double increase or reduction in this bit combination—cause the logic element G2 to be blocked by the output of the level change detector Det2. Thereafter, when the bit combination is retained in the register stages B1 to B4 of the register Regl—that is to say, when no further addition cycle takes place or when only a continuous upwards-downwards-upwards-downwards etc. cycle takes place which always leads to the same binary state between the output signal of the flip-flop FF and the input signal of the register stage B2—a binary "0" signal is produced by the level change detector Det2. The output of the logic element G2 then supplies a binary "1" signal to the AND-gate G1 which, in turn, permits data signals received from the output of the amplifier Am to be passed to the receiving line EL'.

It will be appreciated from the above explanation of the level monitoring device represented in FIG. 2 that not only is the absolute value of the amplifier signal level used as a criterion to determine whether data signals can be forwarded from the output of the amplifer to the receiving line EL', but also signal level changes—that is to say, amplifier control signals which produce such changes—are additionally used for this purpose. Thereafter, when the signal level change in question has fallen below a prescribed value—i.e., when the signal level is sufficiently high and has reached a steady state—then signals emitted from the amplifier Am are allowed to be forwarded to the receiving line EL'.

There has thus been shown and described a novel circuit arrangement for controlling the transmission capacity of the receiving branch of a transmission system which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In a transmission system having separate transmitting and receiving branches connected to a two-wire transmission line via a 2-to-4 wire hybrid circuit; having an echo compensation network coupled between said transmitting and receiving branches; and having an amplifier arranged for amplifying a signal in said receiving branch;

the improvement comprising circuit means for controlling the transmission capacity of said receiving branch which comprises, in combination:

(a) first detector means coupled to said receiving branch for producing a first signal indicating when the signal in said receiving branch is above a prescribed level;

(b) second detector means coupled to said receiving branch for producing a second signal indicating when the change in said signal in said receiving branch does not exceed a prescribed value within a prescribed time; and (c) means responsive to said first and said second signals for enabling transmission through said receiving branch only when the signal applied to said receiving branch is both above said prescribed level and did not change by said prescribed value within said prescribed time.

2. The transmission system recited in claim 1, wherein said circuit means further includes:

(1I) a clock pulse-controlled register having parallel inputs and parallel outputs; and (2) an adder having parallel inputs and parallel outputs, said parallel inputs of said adder being connected to corresponding parallel outputs of said register, and said parallel outputs of said adder being connected to corresponding parallel inputs of said register;

and the second detector means of the circuit means includes (1) a first exclusive-OR gate having an output, a first input connected to one parallel input of said register and a second input connected to one parallel output of said register corresponding to said one parallel input;

(2) a switch responsive to the output of said first exclusive-OR gate, said switch having a first input connected to a further parallel output of said register and having a second input and an output;

(3) a clock-pulse-controlled bistable element having a signal input connected to said output of said switch and a non-inverting output connected to said second input of said switch;

(4I) a second exclusive-OR gate having an output, a first input connected to a further parallel input of said register corresponding to said further parallel output, and having a second input connected to said output of said bistable element; and (5) an AND-gate having an output, a first input connected to said output of said first exclusive-OR gate and a second input connected to said output of said second exclusive-OR gate.

3. The transmission system recited in claim 1 wherein the transmission enabling means comprises an inverting delay element having an input connected to said output of said AND-gate, and an output;

wherein said output of said delay element is the second signal and is logically gated with the first signal, the output of the logic gate forming a control signal for controlling the transmission capacity of said receiving branch.

4. The transmission system recited in claim 3, wherein the first detector means comprises means, responsive to a particular bit pattern in the parallel output of said register, for generating said first signal.

5. A transmission system having separate transmitting and receiving branches connected to a two-wire transmission line via a 2-to-4 wire hybrid circuit; having an echo compensation network coupled between said transmitting and receiving branches; and having an amplifier arranged for amplifying a signal in said receiving branch; characterized in that the amplifier includes means for controlling its amplification in digital steps by means of a digital signal and further characterized by a circuit means for controlling the transmission capacity of said receiving branch comprising means for monitoring the digital control signal for the presence of prescribed bit pattern differences in successive amplifier adjustment time periods.

* * * * *